(No Model.) 2 Sheets—Sheet 1.

G. F. SIMONDS.
BALL BEARING.

No. 449,961. Patented Apr. 7, 1891.

Witnesses.
Robert Everett
J. A. Rutherford

Inventor.
George F. Simonds,
By James L. Norris.
Atty.

(No Model.) 2 Sheets—Sheet 2.

G. F. SIMONDS.
BALL BEARING.

No. 449,961. Patented Apr. 7, 1891.

Witnesses,
Robert Pruitt,
J. A. Rutherford,

Inventor:
George F. Simonds.
By James L. Norris.
Atty.

THE NORRIS PETERS CO., PHOTO-LITHO., WASHINGTON, D. C.

UNITED STATES PATENT OFFICE.

GEORGE F. SIMONDS, OF FITCHBURG, MASSACHUSETTS.

BALL-BEARING.

SPECIFICATION forming part of Letters Patent No. 449,961, dated April 7, 1891.

Application filed December 30, 1890. Serial No. 376,287. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to bearings in which spherical rollers or balls are employed to diminish friction; and it has for its object especially to provide a ball-bearing in which an extended anti-friction surface will be presented for taking the end-thrust of engine and propeller shafts or other rotary bodies, also to provide means for confining and retaining spherical rollers or balls for resisting end-thrust in sectional or divided cages composed of partly annular sections that can be conveniently handled for placing them in position around a shaft without removing or withdrawing said shaft from its supports, and means for securely connecting the several sections of a cage after they have been placed in position.

Figure 1:
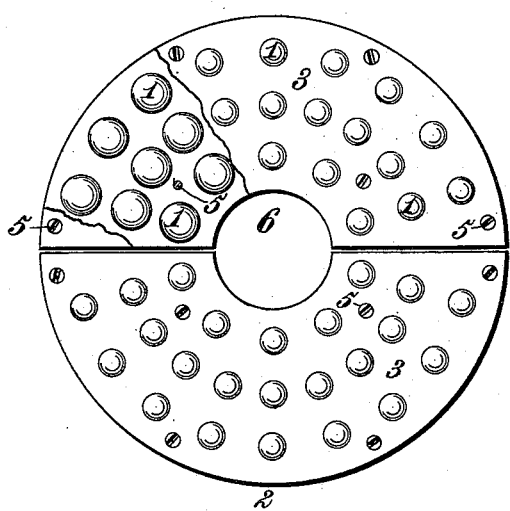
Figure 2:
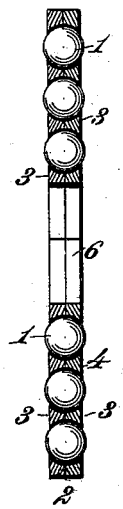
Figure 3:
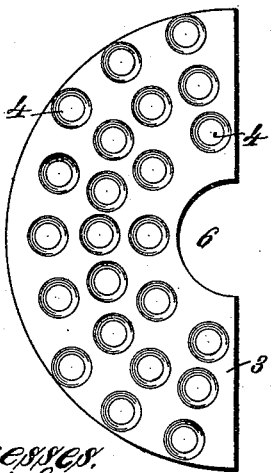
Figure 4:
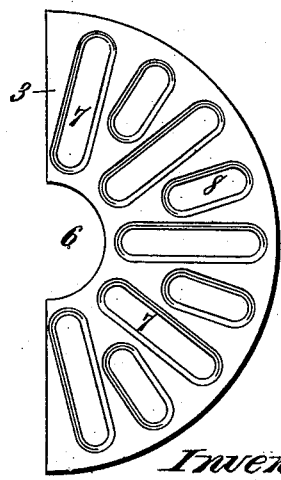
Figure 5:
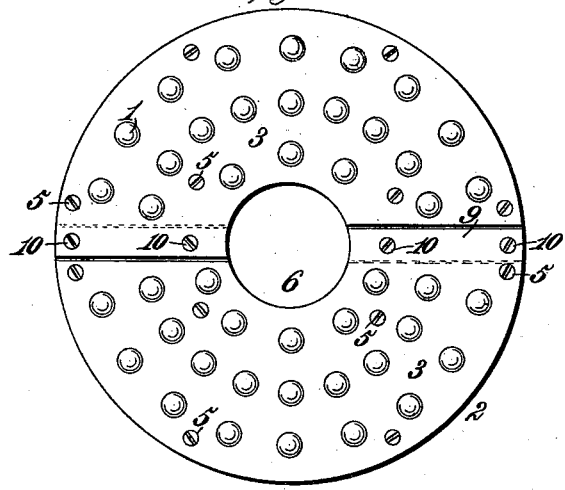
Figure 6:
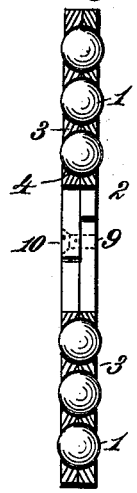
Figure 7:
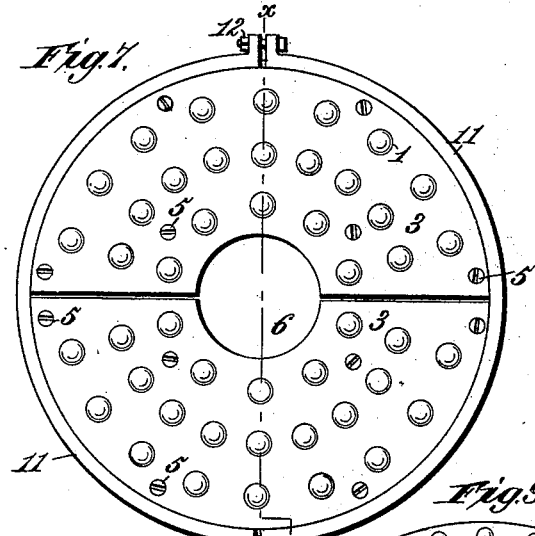
Figure 8:
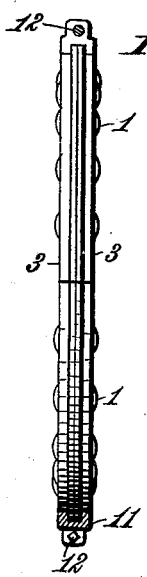
Figure 9:
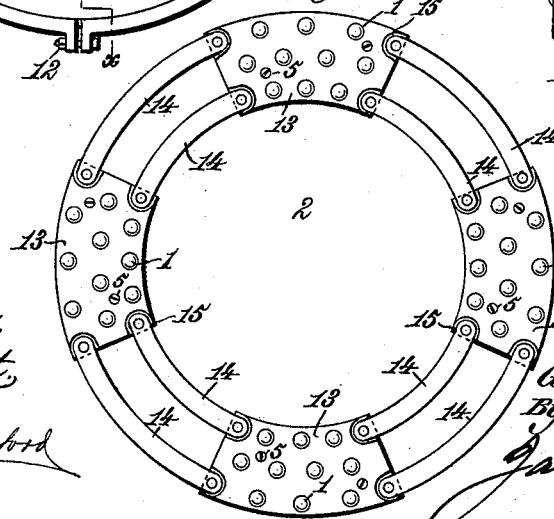

In the annexed drawings, illustrating my invention, Figure 1 is a partly broken away view of a sectional or divided cage inclosing several concentric series of spherical rollers or balls presenting an extended surface for resisting end pressure or thrust. Fig. 2 is a transverse section of the cage, showing the balls protruding from opposite sides in position to resist end pressure or thrust. Fig. 3 is a plan of the inner side of a semicircular plate forming part of a sectional or divided cage and illustrating a modification in the arrangement of the circular openings through which the balls are to protrude. Fig. 4 is a plan of the inner side of a semicircular plate, showing another modification in the form and arrangement of the openings for protrusion of the spherical rollers or balls. Fig. 5 is a plan of a sectional or divided cage provided with means for detachably connecting its separable parts in a single body. Fig. 6 is a transverse section of the same. Fig. 7 is a plan of a sectional or divided cage in which the separable parts or sections are detachably connected at the outer portion of the cage by means of half-rings bolted together. Fig. 8 is a transverse section of the same on the line *x x*. Fig. 9 is a plan of a sectional cage composed of segments of a circle detachably connected at the outer portion of the cage by means of links.

Referring to the drawings, the numeral 1 designates the spherical rollers or balls, and 2 denotes the sectional or divided cage in which said balls are confined or retained, and from which they protrude in position to take end thrust or pressure.

For resisting the pressure of turn-tables or the thrust of propeller-shafts, engine-shafts, and other rotary parts where it is desirable to present large anti-friction surfaces, the spherical rollers or balls 1 may be conveniently arranged in several concentric or radial series within a cage of suitable construction adapted to hold and confine the balls in such a manner as to allow them to revolve freely in all directions and facilitate their application and removal in a body.

In the construction shown in Figs. 1 to 8, inclusive, the divided or sectional cage 2 is composed of semicircular or semi-annular plates 3, having perforations 4, through which the balls 1 can protrude laterally to take end pressure or thrust. Four of these plates 3 are placed together in direct contact with each other throughout their entire adjacent surfaces, and the opposite parallel plates may be secured by means of screw-bolts 5, Figs. 1, 5, and 7, to form the separate sections of an annular cage, in which the balls 1 are inclosed and from which they protrude laterally on both sides of the cage, as shown in Figs. 2, 6, and 8, so that they are adapted to take end-thrust in either direction. The inner edges of the plates 3 are formed with semicircular openings 6, Figs. 3 and 4, which, when the sections of the cage are placed together, form a complete circle, as shown in Figs. 1, 5, and 7, for surrounding a shaft or other cylindrical part to which the ball-bearing is applied. By forming the annular cage 2 in this manner it can be applied with ease to a large shaft or in situations where it would be inconvenient to attach an inseparable annular cage or ball-bearing frame.

It will be observed by reference to Figs. 2, 3, and 6 that the openings 4 are concaved on their inner sides, so that when the plates 3 are placed together they form spherical chambers for receiving and retaining the spherical rollers or balls. These chambers or openings 4 may be arranged radially in concentric series, as shown in Fig. 1, or they may be arranged irregularly, as shown in Fig. 3, and so enable the balls to travel in irregular and intersecting paths to present a more extended bearing-surface and distribute the frictional wear, so that it will be reduced to a minimum.

Instead of providing the plates 3 with circular openings 4, as shown in Fig. 3, the chambers or openings for the balls 1 may be elongated or slotted and arranged radially, as represented in Fig. 4, in which I have shown long slots 7 and shorter slots 8, alternating with each other and extended radially, so as to provide a simple means of arranging the balls in such a manner as to cover extended surfaces and allow for sufficient play to greatly diminish the effects of friction.

It is obvious that by dividing the cage or forming it in separable parts or sections it can be placed around a large shaft with great ease without incurring any necessity of removing or withdrawing said shaft from its supports, thus adding materially to the convenience of inserting and removing the ball-bearing.

For the purpose of detachably connecting the semi-annular sections of the divided cage, two of the four plates 3 may be made somewhat larger than the others, so that two alternate plates can lap each other and form a rabbeted joint 9, secured by screw-bolts 10, as shown in Figs. 5 and 6. By this construction the opposite sections of the cage can be secured together either before or after placing the ball-bearing in position.

When it is desired to secure together the separable parts or sections of the divided cage in a situation where it would be inconvenient to apply the screw-bolts 10, the required detachable connection or fastening together of the cage-sections can be accomplished by means of half-rings or half-bands 11, surrounding the periphery or outer portion of the cage and held by removable bolts 12, as shown in Figs. 7 and 8. In this construction the bolts and half-rings are readily accessible to permit the connection and separation of the cage-sections whenever desired.

As shown in Fig. 9, the separable or divided cage 2 may consist of a number of segmental sections 13, having suitable openings for the spherical rollers or balls 1 confined therein. These cage-sections 13 are preferably connected in annular form by means of links 14, having their ends detachably secured in countersunk recesses 15, formed in the several cage-sections; and as these links are located at or near the outer part of the cage in accessible situations they can be readily detached to permit the separation and removal of the cage from around a shaft.

What I claim as my invention is—

1. The combination, with spherical rollers or balls for taking end-thrust, of a removable cage composed of separable partly annular sections having lateral openings and adapted for holding and retaining said balls in position to revolve freely in all directions and protrude laterally from said cage to resist thrust or end pressure, substantially as described.

2. The combination, with spherical rollers or balls for taking end-thrust, of a cage for holding and retaining balls for a thrust ball-bearing composed of separable partly-annular sections detachably connected at the outer portion of the cage, said sections having lateral openings adapted for holding and retaining said balls in position to revolve freely in all directions and protrude laterally from said cage to resist thrust or end pressure, substantially as described.

3. The combination, with spherical rollers or balls for taking end-thrust, of a cage for holding and retaining balls for a thrust ball-bearing composed of separable partly annular sections detachably connected together, said sections having lateral openings adapted for holding and retaining said balls in position to revolve freely in all directions and protrude laterally from said cage to resist thrust or end pressure, substantially as described.

4. The combination, with spherical rollers or balls for taking end-thrust, of a cage for holding and retaining balls for a thrust ball-bearing composed of segments of a circle fastened together by detachable connecting-links, said sections having lateral openings adapted for holding and retaining said balls in position to protrude laterally from said cage to resist thrust or end pressure, substantially as described.

In testimony whereof I have hereunto set my hand and affixed my seal in presence of two subscribing witnesses.

GEO. F. SIMONDS. [L. S.]

Witnesses:
 JAMES L. NORRIS,
 JAMES A. RUTHERFORD.